United States Patent
Doutaz et al.

(10) Patent No.: US 8,896,458 B2
(45) Date of Patent: Nov. 25, 2014

(54) METHOD AND APPARATUS FOR CONVERTING A DISPLACEMENT OF A MAGNETIC OBJECT INTO A DIRECTLY PERCEPTIBLE SIGNAL, INSTRUMENT INCORPORATING THIS APPARATUS

(75) Inventors: Jerome Doutaz, Grenoble (FR); Roland Blanpain, Entre-Deux-Guiers (FR); Viviane Cattin, Saint Egreve (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 159 days.

(21) Appl. No.: 13/379,457
(22) PCT Filed: Jun. 25, 2010
(86) PCT No.: PCT/EP2010/059089
§ 371 (c)(1),
(2), (4) Date: Feb. 27, 2012
(87) PCT Pub. No.: WO2010/149781
PCT Pub. Date: Dec. 29, 2010

(65) Prior Publication Data
US 2012/0139742 A1 Jun. 7, 2012

(30) Foreign Application Priority Data
Jun. 26, 2009 (FR) ..................... 09 54379

(51) Int. Cl.
G08B 21/00 (2006.01)
G10H 1/055 (2006.01)
G01D 7/02 (2006.01)

(52) U.S. Cl.
CPC ............. *G01D 7/02* (2013.01); *G10H 1/0555* (2013.01); *G10H 2220/201* (2013.01)
USPC ............. 340/669; 340/670; 84/600; 84/603; 84/612; 84/622; 84/626; 84/723; 84/725; 84/735; 84/737; 84/741; 446/26; 446/129; 446/133; 446/143; 446/408; 324/207.11; 324/207.13; 324/247

(58) Field of Classification Search
USPC ........................................... 340/669
See application file for complete search history.

(56) References Cited

U.S. PATENT DOCUMENTS 4,038,539 A * 7/1977 Van Cleave ............ 708/322
4,619,175 A   10/1986 Matsuzaki
(Continued)

FOREIGN PATENT DOCUMENTS

GB          504555        9/1937
JP        2004 085598     3/2004
(Continued)

OTHER PUBLICATIONS

Blanpain, Ronald, "Traitement en temps réel du signal issu d'une sonde magnétométrique pour la détection d'anomalie magnétique", ("Real-time processing of the signal coming from a magnetometrical probe for the detection of magnetic anomalies", I.N.P.G. thesis, Oct. 1979, p. 1.*

(Continued)

*Primary Examiner* — Mohammad Ghayour
*Assistant Examiner* — Adnan Aziz
(74) *Attorney, Agent, or Firm* — Occhiuti & Rohlicek LLP

(57) ABSTRACT

This method of converting a displacement of a magnetic object into a signal directly perceptible by a human being, comprises: —the acquisition (32) of a temporal succession of measurements of a magnetic field modified by the displacements of the object during a sliding time window of predetermined duration, —the construction (34) on the basis of this acquired temporal succession of measurements of several signals each representing a characteristic of the measured magnetic field dependent on a corresponding characteristic of the displacement of the object, and —the adjustment (50) of several parameters of the directly perceptible signal as a function of the signals so as to render these characteristics directly perceptible.

24 Claims, 4 Drawing Sheets

(56) References Cited

U.S. PATENT DOCUMENTS

| | | | |
|---|---|---|---|
| 4,823,804 A * | 4/1989 | Ghislaine et al. | 600/546 |
| 5,025,705 A * | 6/1991 | Raskin | 84/743 |
| 5,054,074 A * | 10/1991 | Bakis | 704/240 |
| 5,571,982 A * | 11/1996 | Masubuchi | 84/658 |
| 7,113,092 B2 * | 9/2006 | Keene | 340/551 |
| 7,297,862 B2 * | 11/2007 | Nishitani et al. | 84/723 |
| 7,352,874 B2 * | 4/2008 | Raptopolous et al. | 381/152 |
| 7,408,108 B2 * | 8/2008 | Ludwig | 84/719 |
| 8,445,769 B2 * | 5/2013 | Takahashi | 84/737 |
| 2003/0167908 A1 * | 9/2003 | Nishitani et al. | 84/723 |
| 2006/0126852 A1 * | 6/2006 | Bruno et al. | 381/17 |
| 2009/0288636 A1 * | 11/2009 | Saito et al. | 123/399 |
| 2010/0263518 A1 * | 10/2010 | Nishitani et al. | 84/612 |
| 2011/0153233 A1 * | 6/2011 | Grenet et al. | 702/57 |

FOREIGN PATENT DOCUMENTS

| | | | |
|---|---|---|---|
| JP | 2004085598 A | * | 3/2004 |
| JP | 2005049515 | | 2/2005 |
| JP | 2005049515 A | * | 2/2005 |
| JP | 2008197360 A | * | 8/2008 |
| WO | WO 2008/087541 | | 7/2008 |

OTHER PUBLICATIONS

Didiot et al. "Une Nouvelle Approche Fondee sur les Ondelettes Pour la Discrimination Parole/Musique" Lornia—CNRS & INRIA Lorraine, BP 239, 54506 Vandoeuvre-les-Nancy, France.

Thesis of Roland Blanpain, Annee Universitaire 1978-1979, 438 pages.

* cited by examiner

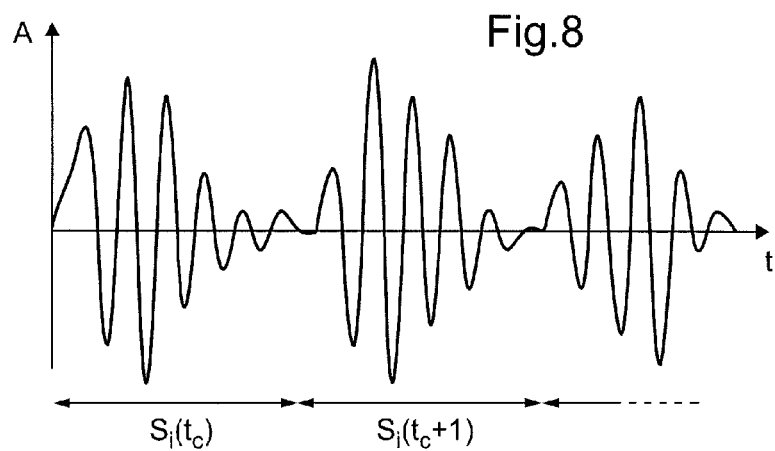
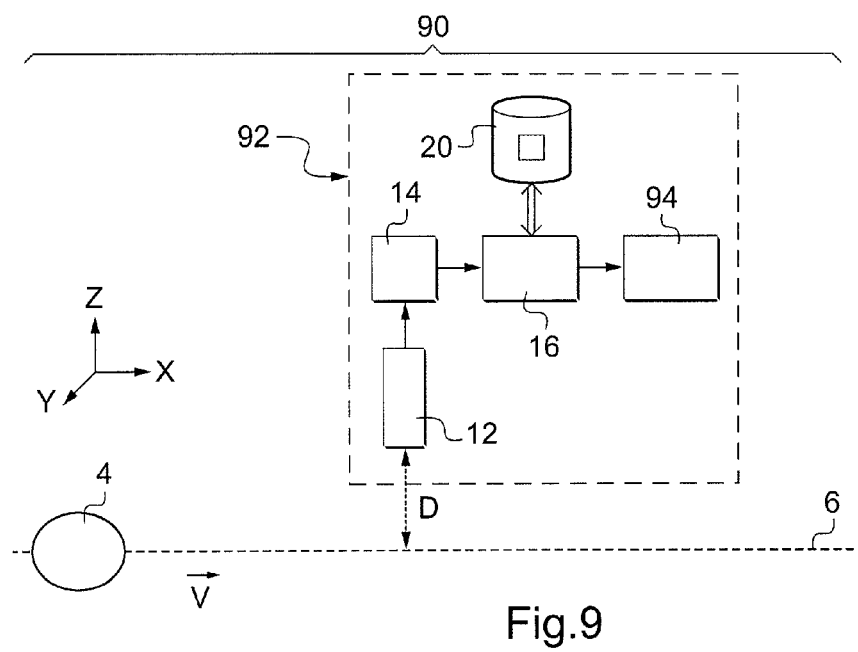

METHOD AND APPARATUS FOR CONVERTING A DISPLACEMENT OF A MAGNETIC OBJECT INTO A DIRECTLY PERCEPTIBLE SIGNAL, INSTRUMENT INCORPORATING THIS APPARATUS

CROSS REFERENCE TO RELATED APPLICATIONS

This application is the national stage entry under 35 USC 371 for PCT/EP2010/059089, filed Jun. 25, 2010, which claims the benefit of the Jun. 26, 2009 priority date of French Application No. 0954379. The contents of both the foregoing applications are incorporated herein by reference.

FIELD OF DISCLOSURE

The invention pertains to a method and apparatus for converting a movement of a magnetic object relatively to a magnetic field sensor into a signal directly perceptible to a human being. The invention also pertains to an instrument incorporating this apparatus for converting.

BACKGROUND

These known conversion methods comprise:
the measurement of a magnetic field modified as a function of the movement of the magnetic object, and
the setting of at least one parameter of the directly perceptible signal as a function of the measured magnetic field.

For example, the patent application JP 2004-08 55 98 describes a method of this kind. In this method, the amplitude of the magnetic field measured in one direction is used to set a parameter of an audible signal.

However, the use of amplitude alone does not make it easy to make several characteristics of the movement of the object simultaneously perceptible. For example, it is difficult to make the speed of movement of the object and a rotation of the object on itself or a variation of this speed simultaneously perceptible.

SUMMARY

The invention seeks to overcome this drawback by proposing a method of conversion by which the characteristics of the magnetic field measured and hence the characteristics of the movement of the magnetic object can be made perceptible differently.

An object of the invention therefore is a method for converting of this kind comprising:
the acquisition of a temporal succession of measurements of the magnetic field during a sliding time window of predetermined duration,
the building, from this acquired temporal succession of measurements, of several signals each representing a characteristic of the magnetic field measured that is a function of a corresponding characteristic of the movement of the object, and
the setting of several parameters of the directly perceptible signal as a function of these signals to render these characteristics directly perceptible.

Processing a temporal succession of measurements makes it possible to simultaneously read several characteristics of the magnetic field modified by the movement of the object and therefore to make several characteristics of the movement of the object directly perceptible.

The embodiments of this method may comprise one or more of the following characteristics:
at least one of the signals built is independent of the position and space of the magnetic object;
the signals are capable of varying independently of one another, and the setting of each parameter is a function of a respective signal built so as to make each of the characteristics of the magnetic field directly and simultaneously perceptible independently of one another;
the building of the signals is obtained by adaptive filtering of the temporal succession of measurements on a base of several orthogonal functions;
the orthogonal functions are Anderson functions;
the building of the signals is obtained by filtering the temporal succession of measurements by means of a group of filters having −3 dB bandwidths that do not overlap and quality factors that are equal;
the group of filters is formed by 12 filters;
the signal directly perceptible to a human being is an audible signal and the set parameters of the audible signal are chosen from the group comprising the volume, the timbre, the frequency of a sound and the duration of a sound;
the directly perceptible signal is a visual signal and the set parameters of this visual signal are chosen from the group comprising the direction of a light beam, the color of a light beam or of a pixel of a screen, the intensity of a light beam or of a pixel of a screen.

These embodiments of the method furthermore have the following advantages:
having available a signal that is independent of the position and space of the magnetic object makes it possible to make only a variation of the position of this object perceptible, and not its position;
the use of signals independent of one another simplifies the use and learning for the user of this method;
the adaptive filtering with Anderson functions enables the setting of the perceptible signal by simply modifying the orientation on itself of the magnetic object during its movement;
the use of a group of filters having bandwidths that are contiguous and having quality factors that are equal simplifies the use and the learning by the user of this method because, in particular, there is then an analogy between this group of filters and the theory of musical notes;
the use of twelve filters in the group makes it possible to cover one octave.

An object of the invention is also an apparatus for converting a movement of a magnetic object into a signal directly perceptible to a human being, this apparatus comprising:
a sensor capable of measuring a magnetic field modified as a function of the movement of the magnetic object,
a computer capable of setting at least one parameter of the directly perceptible signal as a function of the magnetic field measured, this computer being capable, to this effect, of:
acquiring a temporal succession of measurements of the magnetic field during a sliding time window of predetermined duration,
building, from this acquired temporal succession of measurements, several signals each representing one characteristic of the measured magnetic field as a function of a corresponding characteristic of the movement of the object, and setting several parameters of the directly perceptible signal as a function of these signals to make these characteristics directly perceptible.

Finally, an object of the invention is also an instrument comprising a magnetic object moveable by a human being and the above apparatus for converting movements of the magnetic object into a signal directly perceptible to a human being.

The invention will be understood more clearly from the following description, given purely by way of a non-exhaustive example and made with reference to the drawings of which:

DESCRIPTION OF THE FIGURES

FIG. 8 is a schematic illustration of the assembling of the successive responses of a filter to form a directly audible signal, and FIG. 9 is a schematic illustration of an instrument incorporating an apparatus for converting the movement of a magnetic object into a signal that is directly perceptible in ways other than by hearing.

DETAILED DESCRIPTION

In these figures, the same references are used to designate the same elements.

Here below in this description, the features and functions well known to those skilled in the art are not described in detail.

Figure 1:
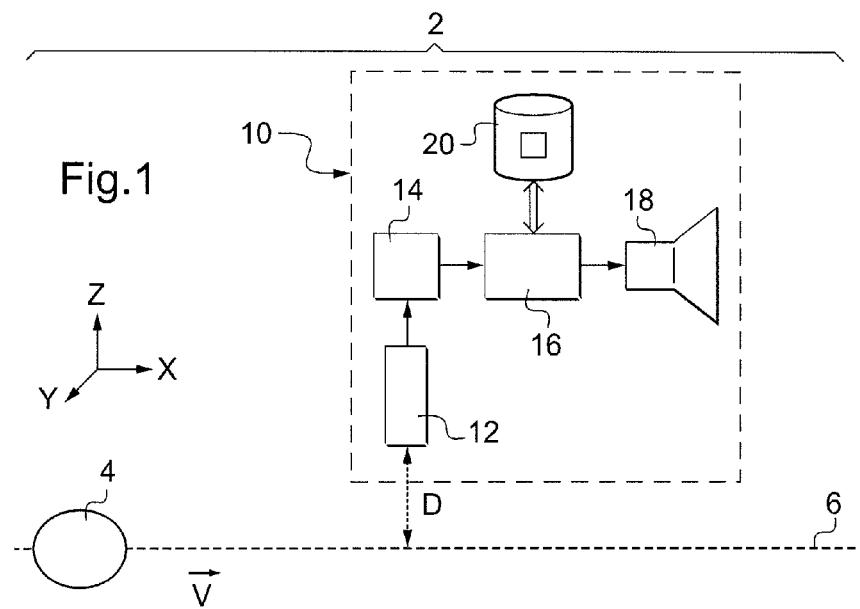
FIG. 1 is a schematic illustration of an instrument incorporating an apparatus for converting the movement of a magnetic object into a directly audible signal.

FIG. 1 represents an instrument 2 generating a signal directly perceptible to a human being. In this embodiment, the instrument 2 is described in the particular case where it generates a signal directly audible to a human being. For example, the instrument 2 is a musical instrument.

This instrument 2 comprises an object whose constituent material has magnetic properties (rare earths, ferrites, steels etc) 4 and that a user can move by hand. The object 4 is for example a bipolar permanent magnet.

Here, the object 4 can easily be moved by the user in a plane or in a three-dimensional space. The movement of the object 4 is activated by hand by the user. For example, the object 4 is shaped to be directly manipulated by hand.

In FIG. 1, a possible rectilinear path 6 for the object 4 is shown. Here below in this description, V denotes the speed of movement of the object 4 along a rectilinear path parallel to the path 6.

The instrument 2 also comprises an apparatus 10 for converting movements of the object 4 into a signal directly audible to a human being. To this end, the apparatus 10 is equipped with:
- A magnetic field sensor 12 capable of converting a measured magnetic field into an electrical signal,
- An analog-digital converter 14 capable of sampling the electrical signal generated by the sensor 12 to obtain a temporal succession of measurements of the magnetic field and
- An electronic computer 16 capable of processing the temporal succession of measurements produced by the convert 14 to activate, in response, a generator 18 of a signal directly audible to the user.

The sensor 12 is situated in proximity to the object 4. The sensor 12 is deemed to be in the proximity to the object 4 when any movement of the object 4 results in a modification of the audible signal perceptible to the user.

Here, the shortest distance between the sensor 12 and the path 6 is denoted as D.

Preferably, the sensor 12 is a triaxial sensor, i.e. a sensor capable of measuring the components of the magnetic field along three orthogonal directions X, Y and Z. Here, the direction X is parallel to the path 6.

Typically, the computer 16 is a programmable computer capable of executing instructions recorded on an information-recording medium. To this end, the computer 16 is connected to a memory 20 comprising the instructions and the data needed to execute the method of FIG. 2 or that of FIG. 5.

For example, the generator 18 is a speaker or a set of speakers.

Figure 2:
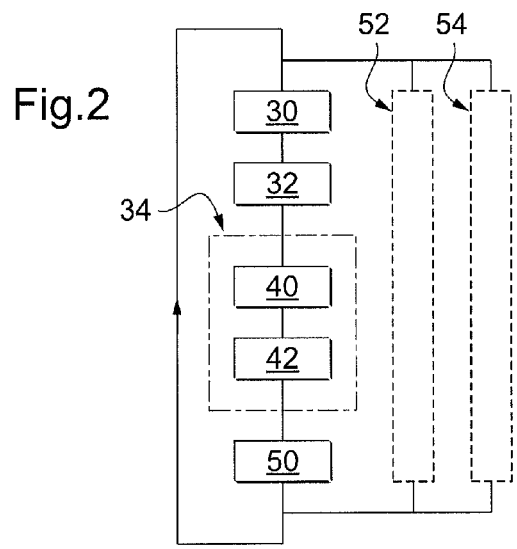
FIG. 2 is a flowchart of a method for converting the movement of a magnetic object into a directly audible signal by means of the apparatus of FIG. 1.

The working of the instrument 2 shall now be described with reference to the method of FIG. 2.

To play the instrument 2, the user manually moves the object 4 to proximity with a sensor 12.

At a step 30, the sensor 12 measures the magnetic field modified by the movement of the object 4. In response, it generates three electrical signals respectively proportional to the components x, y and z of the magnetic field measured along the directions X, Y and Z.

Here below in this description, only the operations of processing the component x are described in detail. The operations for processing the other measured components are similar and derive from the explanations given for the component x.

Figure 3:
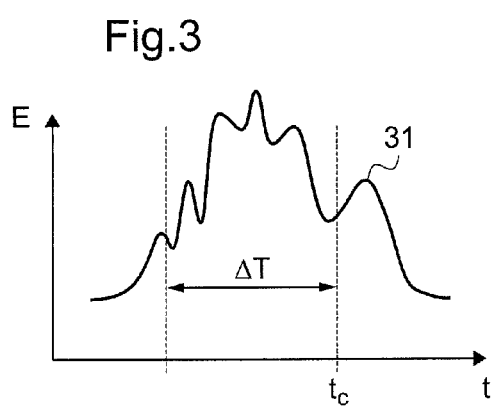
FIG. 3 is a graph schematically illustrating the waveform of a measured magnetic field.

FIG. 3 represents a possible example of a waveform, as a function of time, of an electrical signal 31 generated by the sensor 12 for the component x.

At a step 32, the converter 14 samples the electrical signal 31 to produce a temporal succession of measurements of the magnetic field that is transmitted to the computer 16 as and when each sample is produced.

At the step 32, the computer 16 acquires a temporal succession $S(t_c)$ of measurements of the component x performed during a time window $\Delta T$ having a predetermined duration and ending at the current instant $t_c$. The time window $\Delta T$ is represented in this FIG. 3. For example, the sampling frequency of the converter 14 is 200 Hz and the number of samples of the sequence $S(t_c)$ is 255. The duration $\Delta T$ is therefore 1250 ms.

At a step 34, the computer builds several signals $s_i(t)$ from this temporal succession of measurements, each signal representing a characteristic i independent of the magnetic field measured. The term "independent" characteristic herein designates a characteristic that can vary independently of the other characteristics of the magnetic field measured. For example, the signals $s_i(t)$ are not correlated.

Here, in an operation 40, the computer 16 carries out an adaptive filtering of the $S(t_c)$ on a base of Anderson functions in order to build the signals $s_i(t)$.

Such an adaptive filtering to a base of Anderson functions is for example described in the following document:

R. Blanpain, "*Traitement en temps réel du signal issu d'une sonde magnétométrique pour la détection d'anomalie magnétique*", ("*Real-time processing of the signal coming from a magnetometrical probe for the detection of magnetic anomalies*", I.N.P.G. thesis, October 1979).

Figure 4A:
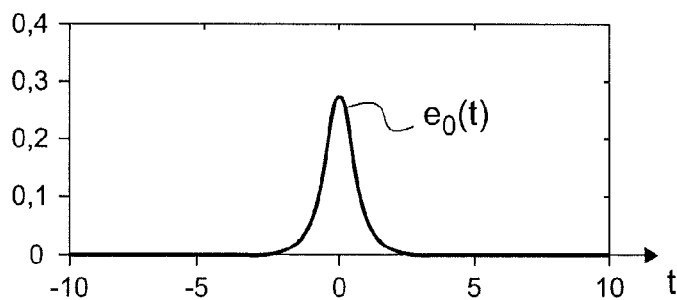
FIGS. 4a to 4c are graphs schematically illustrating the waveforms of an orthogonal base of Anderson functions in field mode.
Figure 4B:
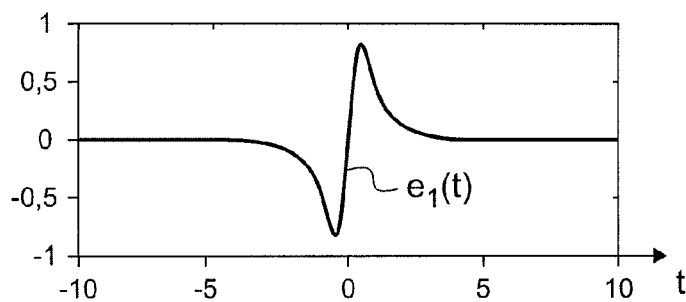
Figure 4C:
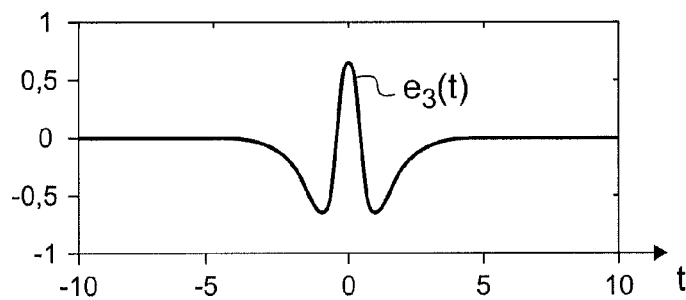

The FIGS. 4a to 4c represent the waveforms of three Anderson orthogonal functions $e_0(t)$, $e_1(t)$ and $e_3(t)$ in field mode. These three functions are defined by the following relationships:

$$e_0(U) = K_0 \frac{1}{(1+U^2)^{5/2}}$$

$$e_1(U) = K_1 \frac{U}{(1+U^2)^{5/2}}$$

$$e_2(U) = K_2 \frac{1-7U^2}{(1+U^2)^{5/2}}$$

where:

$U=(V/D)t$, t being the time;

the coefficients $K_0$, $K_1$ and $K_2$ are the normalization constants chosen in order to have an orthogonal base.

The projection of the sequence $S(t_c)$ on one of the functions $e_j(t)$ is done for example by computing the coefficient $\alpha_i$ of correlation between the sequence $S(t_c)$ and the function $e_i(t)$. This computation is described in detail in the document referred to here above.

More specifically, each function $e_i(t)$ depends not only on the time t but also on the ratio V/D. Here, a set of j values of the ratio V/D is built preliminarily, j being greater than 1 and, preferably, greater than 2 or 10. The function $e_i(t)$ obtained for a particular value of the ratio V/D is denoted as $e_{ij}(t)$, where i is the index of the Anderson function (i=0, 1 or 2) and j is the index of a particular value of the ratio V/D chosen from the preliminarily built set of values. The functions $e_{ij}(t)$ are prerecorded in the memory 20.

At the step 40, the sequence $S(t_c)$ is projected on each of the recorded functions $e_{ij}(t)$. We thus obtain j coefficients $\alpha_{ij}$ of correlation between this sequence $S(t_c)$ and the corresponding function $e_{ij}(t)$.

For each index j, an energy $E_j(t_c)$ is computed using the following relationship:

$$E_j(t_c)=\alpha_{0j}^2+\alpha_{1j}^2+\alpha_{2j}^2$$

Then, again at the step 40, the computer 16 selects the value m of the index j which maximizes the energy $E_j(t_c)$. This value m corresponds to a set of coefficients $\alpha_{im}$.

Then, at a step 42, a filtering is done to maximize the likelihood between the sequence $S(t_c)$ and the functions of the Anderson base. For example, at the step 42, the energy $E_m(t_c)$ is compared with the energies $E_m(t_c-1)$ and $E_m(t_c-2)$ computed respectively during the two preceding iterations of the step 40.

New signals $s_j(t)$ are built only if the following two relationships are met:

$$E_m(t_c)<E_m(t_c-1), \text{ and}$$

$$E_m(t_c-1)>E_m(t_c-2)$$

If the answer is yes, the computer builds the following signals $s_j(t)$:

$$s_0(t)=\alpha_{0m}*e_{0m}(t),$$

$$s_1(t)=\alpha_{1m}*e_{1m}(t), \text{ and}$$

$$s_2(t)=\alpha_{2m}*e_{2m}(t)$$

where the index m and the coefficients $\alpha_{im}$ are those determined during the preceding iteration of the step 40, i.e. those determined from the sequence $S(t_c-1)$.

If new signals $s_i(t)$ are built, then the computer 16 carries out a step 50 for setting different independent parameters of an audible signal played by the generator 18. For example, the parameters of the audible signal are chosen from the group comprising the volume, the timbre, the frequency of a sound and the duration of a sound.

For example, the value m is used to select a set of three different notes $n_i$. The values of the coefficients $\alpha_{im}$ are used to set the volume of a respective note $n_i$. Thus, four characteristics of the magnetic field measured, and therefore of the movement of the object 4, are simultaneously presented to the user, namely the coefficients $\alpha_{im}$ of correlation with the Anderson field functions and the ratio V/D.

The correlation between the component x and one of the functions $e_i(t)$ is maximum when the object 4 is moved at constant speed V along a rectilinear path parallel to the direction X with its bipolar field aligned on one of the three directions X, Y or Z. In this case, the component x is correlated solely with only one of the three functions $e_i(t)$. Thus, the signals $s_i(t)$ enable the orientation of the object 4 and the path followed by the object 4 to be made simultaneously perceptible.

In another embodiment, the values of the coefficients $\alpha_{im}$ are used to control the timbre of a respective note $n_i$ played. The coefficients $\alpha_{im}$ can also be used to control the frequency of a note or the duration of a note.

It is also possible to use the waveforms of the signals $s_j(t)$. For example, these waveforms are directly used to generate a sound signal having the same temporal envelope.

At the end of the step 50, the method returns to the step 30. The procedure described here above is reiterated for a time window $\Delta T$ offset by one sample in time. The process temporal sequence is then the sequence $S(t_c+1)$.

What has been described in the particular case of the components x of the magnetic field measured can also be done in parallel, at the steps 52 and 54, respectively for the components y and z. Thus, the generator 18 also in parallel plays audible signals representing characteristics of the components y and z.

Figure 5:
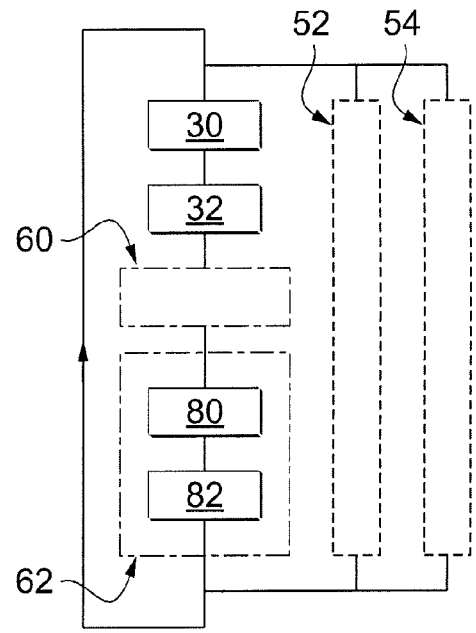
FIG. 5 is a flowchart of another method for converting the movement of a magnetic object into a directly audible signal.

FIG. 5 represents another method for converting the movement of the object 4 into a signal directly audible by a human being that can be implemented in the apparatus 10. The method of FIG. 5 is identical to the method of FIG. 2 except for the steps 34 and 50 which are replaced respectively by steps 60 and 62.

At the step 60, the computer 16 uses a group of 12 filters $F_i$ to build the signals $s_i(t)$, where i is the index of the filter.

Figure 6:
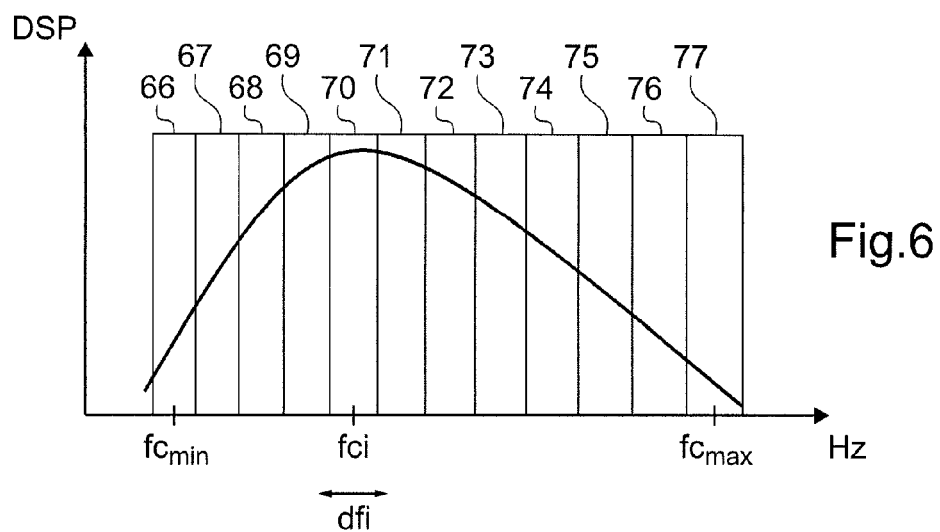
FIG. 6 is a schematic illustration of the distribution of the bandwidths of a group of filters used to implement the method of FIG. 5.

FIG. 6 shows the −3 dB bandwidths 66 to 77 of each of the filters $F_i$ in a graph where the x-axis is graduated in frequencies. To simplify FIG. 6, the scale of the x-axis is not linear. These bandwidths are contiguous and do not overlap. Here, the bandwidth of each filter $F_i$ is characterized by a central frequency $fc_i$ and by −3 dB bandwidth of $df_i$. The quality factor $Q_i$ of each filter $F_i$ is defined by the following relationship:

$$Q_i=fc_i/df_i$$

Here, the quality factors $Q_i$ are all equal. Such a choice enables an analogy to be drawn between the signals $s_i(t)$ built and the theory of musical notes. According to this analogy, the response of each filter corresponds to a note and the response of the group of filters gives a chord. The width of the frequency interval between the smallest central frequency $fc_{min}$ and the greatest central frequency $fc_{max}$ covers the equivalent of one octave and the number of filters is the equivalent of a number of halftones. The frequency $fc_{min}$ and the width $df_{min}$ are chosen so as to eliminate the continuous components of the magnetic field measured.

At a step 60, the computer 16 builds the responses $s_i(t)$ of each of the filters $F_i$ excited at input by the sequence $S(t_c)$.

Figure 7:
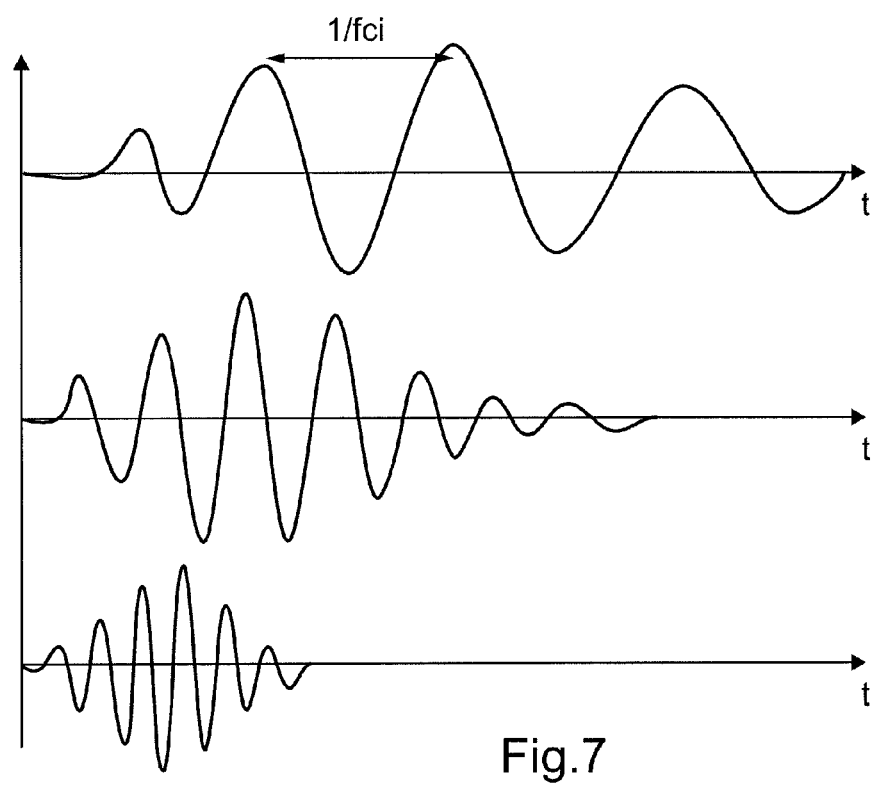
FIG. 7 is a schematic illustration of responses of three filters of the group of filters implemented in the method of FIG. 5.

FIG. 7 is a schematic illustration of the waveform of three signals $s_i(t)$ built by three distinct filters $F_i$ in response to the same sequence $S(t_c)$.

At the step 62, the signals $s_i(t)$ are used to set the audible signal generated. For example, at an operation 80, the computer 16 compresses the response $s_i(t)$ of the filter $F_i$ so that its duration is equal to the sampling period. This operation 80 is performed for each of the responses $s_i(t)$ of each of the filters of the group of filters.

Then, during an operation 82, the compressed response $s_i(t)$ obtained successively in response to the sequences $S(t_c)$, $S(t_c+1)$, $S(t_c+2)$, ... of a same filter $F_i$ are placed end to end to form a continuous sound signal. The generator 18 simultaneously plays the different continuous sound signals thus obtained from the response of each filter $F_i$.

An example of such a continuous sound signal is illustrated in FIG. 8. In this figure, the successive sequences $s_i(t)$ are denoted as $S_i(t_c)$, $s_i(t_c+1)$, ....

FIG. 9 represents an instrument 90 generating a signal directly perceptible to a human being in a way other than by hearing. The instrument 90 is identical to the instrument 2 except that the apparatus 10 is replaced by an apparatus 92 for converting movements of the object 4 into a signal that is directly perceptible otherwise than by hearing. For example, this directly perceptible signal is a visual, olfactory or touch-perceptible signal. To this end, the apparatus 92 is identical to the apparatus 10 except that the generator 18 is replaced by a generator 94 of this signal directly perceptible otherwise than by hearing.

For example, the generator 94 generates a visual signal. In this case, the signals $s_i(t)$ are used to modify one parameter of this visual signal chosen from the group comprising the direction of a light beam, the color of a light beam or of a pixel of an image, the intensity of a light beam or of a pixel of the image.

For example, the signals $s_i(t)$ are used to drive:
the angle of illumination of a scene,
the range of the illumination of a scene (shades of illumination of a scene ranging from warm colors to cold colors) or
the intensity of the illumination.

When the signals $s_i(t)$ are the result of a projection on three orthogonal functions, the three coefficients $\alpha_{im}$ are used to encode the color of a pixel or of a set of pixels. For example, each coefficient $\alpha_{im}$ drives the level of one of the basic colors in a red, green blue (RGB) color encoding scheme.

Many other embodiments are possible. For example, the signals $s_i(t)$ are obtained by adaptive filtering on a base of Anderson functions of types other than those described with reference to FIGS. 4a to 4c. For example, it may be a base of Anderson functions in gradient mode.

It is also possible to use other bases of functions other than Anderson functions. For example, wavelets can be used so as to obtain a decomposition of the magnetic field measured on a base of wavelets.

The building of the signals $s_i(t)$ can also be obtained by filtering this temporal succession of measurements by means of a low-pass filters or high-pass filters or bandwidth filters carefully arranged so as to produce signals that are "interesting" from a musical viewpoint.

As a variant, the magnetic field sensor may be a magnetic field vector sensor that is a mono-axial or biaxial or more than triaxial sensor or a magnetic field scalar sensor.

The object 4 is not necessarily a permanent magnet. It can also be an electromagnet or any other object, the material of which can modify the magnetic field measured by the sensor 12 when it is moved. Thus, the object 4 can be a simple magnetic core that deforms the lines of a pre-existing magnetic field. The pre-existing magnetic field can be created by an electromagnet fixed relatively to the sensor 12. For example, in the latter case, the magnetic core will be a ferromagnetic core.

The moving of the object 4 can be guided in one or more directions in order to restrict the freedom of movement of the object 4 in this direction or directions.

As a variant, the signals $s_i(t)$ built can be signals correlated with each other.

The parameters of the directly perceptible signal can also be set using any function of the coefficients $\alpha_{im}$. For example, at least one of the parameters is set as a function of $\alpha_{im}^2$.

The generator 18 may be other than a speaker. For example, the generator 18 has several electrically actuatable hammers and several different rods or cords facing each of these hammers. The computer 16 activates the movement of different hammers depending on the signals $s_i(t)$ built. The musical instrument thus obtained is then close to a percussion instrument.

In another embodiment, the embodiments of FIGS. 1 and 9 are combined to generate both signals that are directly audible and signals that are directly perceptible to a sense other than hearing. For example, the generator generates both audible and visual signals.

It is also possible to superimpose, on the directly perceptible signals described here above, other directly perceptible signals independent of the movements of the object 4. For example, these other signals represent magnetic signals naturally existing in the environment of the sensor 12 such as:
geomagnetic signals from the earth, the magnetosphere, the interaction of solar wind with the magnetosphere,
signals generated by motions of the sea, such as waves, magnetic storms, etc and
artificial signals generated by human activity, such as magnetic fields created by electrical mains supply currents, the motions of various objects such as vehicles, moving parts of certain objects etc.

What has been described there above in the particular case where the magnetic object moves relatively to the sensor can also be applied to the reverse case where it is the sensor that moves relatively to the magnetic object.

The invention claimed is:

1. A method for converting a movement of a magnetic object relative to a magnetic field sensor into a signal directly perceptible to a human being, said method comprising: measuring, using the magnetic field sensor, one component of a magnetic field modified as a result of movement of the magnetic object, acquiring a temporal succession of measurements of the one component of the magnetic field during a sliding time window of predetermined duration, building, from the acquired temporal succession of measurements of the one component of the magnetic field, a first set of several signals, the first set of said several signals representing a characteristic of the measured one component of the magnetic field that is based on a corresponding characteristic of the movement of the magnetic object, and setting several parameters of the directly perceptible signal based on the first set of several signals to render the characteristics directly perceptible.

2. The method of claim 1, wherein at least one of the several signals built is independent of the position in the space of the magnetic object.

3. The method of claim 1, wherein:
the signals are capable of varying independently of one another, and
the setting of each parameter is a function of a respective signal built so as to make each of the characteristics of the magnetic field directly and simultaneously perceptible independently of one another.

4. The method of claim 1, wherein building several signals comprises adaptively filtering the temporal succession of measurements on a base of several orthogonal functions.

5. The method of claim 4, wherein the orthogonal functions are Anderson functions.

6. The method of claim 1, wherein building the several signals comprises filtering the temporal succession of measurements using a group of filters having non-overlapping −3 dB bandwidths having equal quality factors.

7. The method of claim 6, wherein the group of filters is formed by a dozen filters.

8. The method of claim 1, wherein the signal directly perceptible to a human being is an audible signal, and the set parameters of the audible signal include volume.

9. The method of claim 1, wherein the directly perceptible signal is a visual signal and the set parameters of the visual signal include color.

10. The method of claim 1, wherein the directly perceptible signal is a visual signal and the set parameters of the visual signal include intensity.

11. The method of claim 10, wherein the intensity is an intensity of a pixel on a screen.

12. The method of claim 10, wherein the intensity is an intensity of a light beam.

13. The method of claim 1, wherein the directly perceptible signal is a visual signal and the set parameters of the visual signal include a direction of a light beam.

14. The method of claim 9, wherein the color is a color of a pixel on a screen.

15. The method of claim 9, wherein the color is a color of a light beam.

16. The method of claim 1, wherein the signal directly perceptible to a human being is an audible signal, and the set parameters of the audible signal include the frequency of the sound.

17. The method of claim 1, wherein the signal directly perceptible to a human being is an audible signal, and the set parameters of the audible signal include the timbre of the sound.

18. The method of claim 1, wherein the signal directly perceptible to a human being is an audible signal, and the set parameters of the audible signal include the duration of the sound.

19. The method of claim 1, further including measuring, using the magnetic field sensor, a second component of a magnetic field modified as a result of said movement of the magnetic object, acquiring a temporal succession of measurements of the second component of the magnetic field during the sliding time window of predetermined duration, building, from the acquired temporal succession of measurements of the second component of the magnetic field, a second set of several signals, each of said second set of several signals representing a characteristic of the measured second component of the magnetic field that is based on a corresponding characteristic of the movement of the magnetic object, and additionally using the second set of several signals to set said several parameters of the directly perceptible signal to render the characteristics directly perceptible.

20. The method of claim 19, further including measuring, using the magnetic field sensor, a third component of a magnetic field modified as a result of said movement of the magnetic object, acquiring a temporal succession of measurements of the third component of the magnetic field during the sliding time window of predetermined duration, building, from the acquired temporal succession of measurements of the third component of the magnetic field, a third set of several signals, each of said third set of several signals representing a characteristic of the measured third component of the magnetic field that is based on a corresponding characteristic of the movement of the magnetic object, and additionally using the third set of several signals to set said several parameters of the directly perceptible signal to render the characteristics directly perceptible.

21. An apparatus for converting a movement of a magnetic object relative to a magnetic field sensor into a signal directly perceptible to a human being, the apparatus comprising: a sensor capable of measuring one component of a magnetic field modified as a result of movement of the magnetic object, a computer capable of acquiring a temporal succession of measurements of the one component of the magnetic field during a sliding time window of predetermined duration, building, from the acquired temporal succession of measurements of the one component of the magnetic field, a first set of several signals, the first set of several signals representing a characteristic of the measured one component of the magnetic field that is based on a corresponding characteristic of the movement of the magnetic object, and setting several parameters of the directly perceptible signal based on the first set of several signals to render the characteristics directly perceptible.

22. The apparatus of claim 21, further comprising a magnetic object moveable by a human being.

23. The apparatus of claim 21 wherein the magnetic field sensor is further capable of measuring a second component of a magnetic field modified as a result of said movement of the magnetic object, and said computer is further capable of acquiring a temporal succession of measurements of the second component of the magnetic field during the sliding time window of predetermined duration, building, from the acquired temporal succession of measurements of the second component of the magnetic field, a second set of several signals, each of said second set of several signals representing a characteristic of the measured second component of the magnetic field that is based on a corresponding characteristic of the movement of the magnetic object, and additionally using the second set of several signals to set said several parameters of the directly perceptible signal to render the characteristics directly perceptible.

24. The apparatus of claim 23 wherein the magnetic field sensor is further capable of measuring a third component of a magnetic field modified as a result of said movement of the magnetic object, and said computer is further capable of acquiring a temporal succession of measurements of the third component of the magnetic field during the sliding time window of predetermined duration, building, from the acquired temporal succession of measurements of the third component of the magnetic field, a third set of several signals, each of said third set of several signals representing a characteristic of the measured third component of the magnetic field that is based on a corresponding characteristic of the movement of the magnetic object, and additionally using the third set of several signals to set said several parameters of the directly perceptible signal to render the characteristics directly perceptible.

* * * * *